(12) United States Patent
Corghi

(10) Patent No.: US 7,982,766 B2
(45) Date of Patent: Jul. 19, 2011

(54) METHOD AND DEVICE FOR DETERMINING THE ALIGNMENT OF THE WHEELS OF A VEHICLE

(75) Inventor: Giulio Corghi, Correggio (IT)

(73) Assignee: Corghi S.p.A., Correggio (Reggio Emilia) (IT)

( * ) Notice: Subject to any disclaimer, the term of this patent is extended or adjusted under 35 U.S.C. 154(b) by 1341 days.

(21) Appl. No.: 11/391,472

(22) Filed: Mar. 29, 2006

(65) Prior Publication Data

US 2006/0239542 A1 Oct. 26, 2006

(30) Foreign Application Priority Data

Apr. 26, 2005 (IT) ................ RE2005A0043

(51) Int. Cl.
*H04N 15/00* (2006.01)
*H04N 7/18* (2006.01)
*G01B 11/26* (2006.01)
*G01C 1/00* (2006.01)
*G06K 9/00* (2006.01)

(52) U.S. Cl. ............... 348/140; 348/48; 356/139.09; 356/155; 382/154

(58) Field of Classification Search .......... 348/42, 348/47, 48, 94–95, 135, 140; 356/139.09, 356/155; 382/154
See application file for complete search history.

(56) References Cited

U.S. PATENT DOCUMENTS

| | | | | |
|---|---|---|---|---|
| 4,381,548 A | * | 4/1983 | Grossman et al. | ............ 701/29 |
| RE33,144 E | * | 1/1990 | Hunter et al. | ............ 356/139.09 |
| 5,488,472 A | * | 1/1996 | January | ............ 356/139.09 |
| 5,535,522 A | | 7/1996 | Jackson | |

(Continued)

FOREIGN PATENT DOCUMENTS

DE 42 12 426 C1 7/1993

(Continued)

OTHER PUBLICATIONS

P. Tissainayagam (raj@tns.nec.com.au), "Assessing the Performance of Corner Detectors for Point Feature Tracking Applications", Transmissions Systems Division NEC (Australia) Pty. Ltd. 649-655 Springvale Road, Mulgrave, Victoria 3170, Australia app. 1-24; and D. Sutter (d.suter@eng.monash.edu.au), Dept. of Electrical and Computer Systems Engineering Monash University Clayton, Victoria 3800 (Australia), (2004).

(Continued)

*Primary Examiner* — Sinh Tran
*Assistant Examiner* — Daniel M Pasiewicz
(74) *Attorney, Agent, or Firm* — Browdy and Neimark, PLLC

(57) ABSTRACT

Method for determining the angles and the characteristic parameters of the alignment of a vehicle situated at a measurement location comprising the following steps: equipping each of the wheels of the vehicle with a flat target carrying any design; determining the relationship between the position of the target and the wheel; arranging at least one pair of television cameras making a stereo system in a position such as to see at least the target associated with a wheel; creating a spatial reference system W to which the three-dimensional image of the target created by said at least one pair of television cameras refers; processing the three-dimensional image of the target collected by the two television cameras and determining the angular orientation and the position of the target in the spatial reference system W; using said position and angular orientation to determine the alignment of the wheel relative to the spatial reference system.

15 Claims, 13 Drawing Sheets

U.S. PATENT DOCUMENTS

| | | | |
|---|---|---|---|
| 5,675,515 A * | 10/1997 | January | 700/279 |
| 5,724,128 A * | 3/1998 | January | 356/139.09 |
| 5,724,129 A * | 3/1998 | Matteucci | 356/139.09 |
| 5,870,315 A * | 2/1999 | January | 700/279 |
| 6,064,750 A * | 5/2000 | January et al. | 382/103 |
| 6,134,792 A * | 10/2000 | January | 33/203.18 |
| 6,252,973 B1 | 6/2001 | January et al. | |
| 6,341,013 B1 * | 1/2002 | Battiti et al. | 356/139.09 |
| 6,397,164 B1 * | 5/2002 | Nobis et al. | 702/150 |
| 6,657,711 B1 * | 12/2003 | Kitagawa et al. | 356/155 |
| 6,748,796 B1 * | 6/2004 | Van Den Bossche | 73/116.01 |
| 7,538,864 B2 * | 5/2009 | Golab et al. | 356/139.09 |
| 7,702,126 B2 * | 4/2010 | Strege et al. | 382/100 |
| 7,860,295 B2 * | 12/2010 | Donner et al. | 382/141 |
| 2002/0027651 A1 * | 3/2002 | Jackson et al. | 356/139.09 |
| 2003/0142294 A1 * | 7/2003 | Jackson et al. | 356/139.09 |
| 2005/0041847 A1 * | 2/2005 | Dorrance et al. | 382/141 |
| 2005/0068522 A1 * | 3/2005 | Dorrance et al. | 356/139.09 |
| 2005/0078304 A1 * | 4/2005 | Dorrance et al. | 356/139.09 |

FOREIGN PATENT DOCUMENTS

| | | |
|---|---|---|
| DE | 100 50 653 A1 | 5/2002 |
| EP | 0 803 703 A1 | 10/1997 |
| EP | 0 971 205 A | 1/2000 |
| JP | 05-306918 | 11/1993 |
| JP | 09-133510 A | 5/1997 |
| JP | 11-152060 A | 6/1999 |
| JP | 2001-504237 A | 3/2001 |
| WO | 99/23464 A1 | 5/1999 |

OTHER PUBLICATIONS

E. Trucco et al., "Introductory Techniques for 3-D Computer Vision—Chapter 8: Motion", Prentice Hall ISBN 0132611082; pp. 177-194 (1998).

R. Hartley et al., "Multiple View Geometry in Computer Vision—Chapter 8: Epipolar Geometry and the Fundamental Matrix", Cambridge University Press ISBN 0521623049; pp. 219-243 (2000).

C. Tosmasi et al., "Shape and Motion from Image Streams: a Factorization Method-Part 3: Detection and Tracking of Features", Carnegie Mellon University, Technical Report CMU-CS-91-132; pp. 1-20 (1991).

C. Harris et al., "A Combined Corner and Edge Detector", Proceedings of the Fourth Alvey Vision Conference; pp. 147-151 (1988).

Japanese Office Action of Appln. No. 2006-113114 mailed Feb. 2, 2011.

* cited by examiner

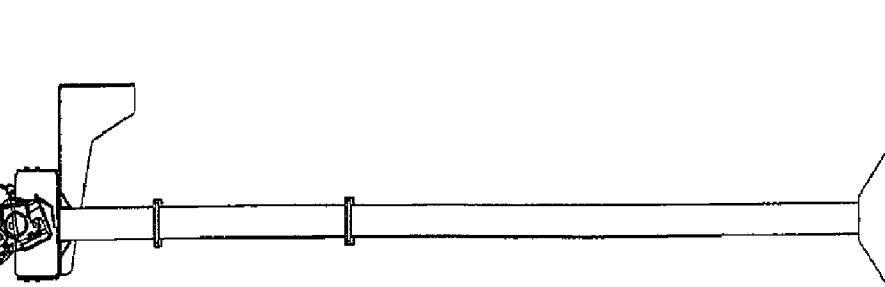
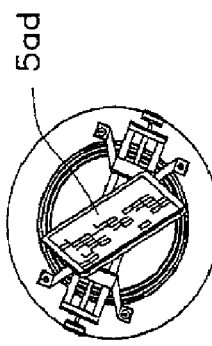
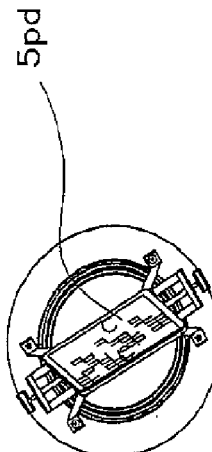
FIG.6

METHOD AND DEVICE FOR DETERMINING THE ALIGNMENT OF THE WHEELS OF A VEHICLE

The present invention concerns a device suitable for measuring the characteristic angles of the wheels of a vehicle and distances between the wheels, these measurements being essential for adjusting the alignment of the vehicle.

The characteristic angles of the wheels and the other geometric data upon which the alignment of the vehicle depends are the following:

left, right and total front toe
left, right and total rear toe
right and left front camber
right and left rear camber
right and left caster
right and left king-pin
front and rear set-back
thrust angle
front track
rear track
left side pitch
right side pitch
track difference In order to gain a better understanding of the text we recall the following definitions:

toe is the angle formed by the plane perpendicular to the axis of each wheel with the axis of longitudinal symmetry of the vehicle.
total toe is the angle resulting from the sum of the toe angles relative to the wheels belonging to the same axis.
camber is the angle formed by the plane perpendicular to the axis of each wheel with the vertical plane.
caster is the angle between the projection of the steer axis on the longitudinal plane of the vehicle and the vertical.
king-pin is the angle formed by the projection of the steer axis on the transversal plane of the vehicle with the vertical.
set-back is the misalignment between the wheels of the same axle with respect to the axis of symmetry of the vehicle.
thrust angle is the axis defined by the bisector of the rear total toe angle.
track difference is the angle between the line that joins the wheels arranged on the same side, but belonging to two different axles, and the axis of symmetry of the vehicle.

THE STATE OF THE ART

The most recent known devices used to measure the characteristic angles and then adjust the alignment of the wheels of a vehicle are based upon opto-electronic measuring and detection instruments.

These devices, described for example in U.S. Pat. Nos. 5,535,522 and 6,252,973, allow the orientation of planar objects, known as targets, applied to the wheels of the vehicle, relative to a reference plane, to be determined, and allow the characteristic angles of the wheel to be worked out from said orientation.

The determination of the orientation of each target is carried out by taking at least one "monoscopic" image thereof, or rather of the design of known geometric shape carried by it, and determining its spatial position comparing each image with the sample image of said design. Indeed, as described in U.S. Pat. No. 5,535,522 a design formed from circular elements of different size is shown on the flat target. The image on the television camera of each of these circles is therefore an ellipse. Through the calculation of the centroid of each of these circles the system works out the perspective distance between these centres and comparing it with the real one known beforehand is able to determine the orientation of the television cameras from the planes that display the designs.

U.S. Pat. No. 6,252,973 evolves the method described in U.S. Pat. No. 5,535,522 that makes it possible to pass from one image to a group of reference points known as "constellation" obtaining each if the points of the constellation thanks to the intersection of three segments.

The data detected by said devices are sent to a processor that processes them using well-known geometric formulae that give as the result the values of the characteristic angles of the alignment of the frame.

LIMITATIONS AND DRAWBACKS OF THE PRIOR ART

Known devices suffer from some limitations.

Firstly, the memory of the processor must already know the geometric shape and the size of the design carried by the target and thus have a reference model to determine the angular position of the targets from the images obtained by the television cameras.

The aforementioned drawback is not insubstantial, since just one of the targets has to be slightly damaged with a change in planarity, or else dirtied with a change in the image received by the television camera associated with the wheel, to make the system ineffective. It is not possible to use targets of different or unknown shape and size, to extend the measurement to industrial vehicles, thus longer than normal automobiles, with greater distances between target and television camera, and with larger designs, without changing the memory data of the processor.

Another drawback encountered on these apparatuses is that they require a target lighting system with visible light that can be irritating to the operator carrying out the alignment.

PURPOSE OF THE INVENTION

The purpose of the invention is to provide a system for measuring all of the characteristic angles of the wheels of a vehicle that eliminates the aforementioned drawbacks and makes the measurement more precise and quicker that it is according to the prior art.

This purpose is accomplished by a system defined in the independent claims; the dependent claims refer to partially alternative solutions or to possible variant embodiments of the invention.

DEFINITION OF THE INVENTION

The invention overcomes the drawbacks of the methods described in U.S. Pat. Nos. 5,535,522 and 6,252,973, in the following way that allows the position of a plane to be determined with respect to a television camera.

Firstly, the method according to the finding foresees passing from any single image to a constellation of characteristic points of the design making use of known "feature extraction" algorithms like for example those of "corner detection", which can easily be obtained from the following bibliography:

C. G. Harris and M. J. Stephens, "Combined Corner and Edge Detector", in *Proceedings of the Fourth Alvey Vision Conference*, Manchester, pages 147-151, 1988;

C. Tomasi and T. Kanade, "Detection and Tracking of Point Features", Carnegie Mellon University, *Tech. Report CMU-CS*-91-132, April 1991;
Assessing the Performance of Corner Detectors for Point Feature Tracking Applications
\*\*P. Tissainayagam raj@tns.nec.com.au Transmissions Systems Division NEC (Australia) Pty. Ltd. 649-655 Springvale Road, Mulgrave, Victoria 3170, Australia
\*D. Suter d.suter@eng.monash.edu.au Dept. of Electrical and Computer Systems Engineering Monash University Clayton, Victoria 3800, Australia).

Once the constellation of points has been determined, to determine the distance and orientation of the design on the target with respect to the television cameras the finding makes use of the stereoscopic vision method.

Thanks to the use of epipolar geometry and of known 3D reconstruction techniques, applied to two images of the same scene obtained by two television cameras, it is possible to establish the real distance between two points of an image, and evolving the concept, knowing the relative position of the two television cameras, it is possible to establish the distance and the rotation of a group of unknown points with respect to one of the two television cameras that define a "stereo television camera".

Stereo television cameras are television cameras with two optics used to capture 3D (three-dimensional) images.

A 2D (two-dimensional) image of an object is a group of pixels without a metric correlation with the size of the object depicted.

A 3D image of an object is a group of pixels distributed in a three-dimensional reference system with known correlation with the real size of the object.

The invention is based upon the use of known stereoscopic vision techniques, which are taken to be known here, see for example the following bibliography:
Richard Hartley and A. Ziesserman "MULTIPLE VIEW GEOMETRY IN COMPUTER VISION" Cambridge University Press ISBN0521623049;
Trucco e Verri—Introductory Techniques for 3-D Computer Vision.

Thanks to known stereoscopic vision techniques, thus having a pair of television cameras, which makes a stereo system, having a known position with respect to each other, it is possible to determine the position of an object of whatever shape relative to one of the television cameras of the pair.

The aforementioned television camera of the pair of television cameras thus constitutes the spatial reference system in which the position of the object is located.

Every other position of the object in the reference system is identified by a translation (T) and by a rotation (R) with respect to the spatial reference system defined above.

The object of whatever shape is, in the case we are concerned with here, a flat target carrying a design of any geometric shape and unknown size.

According to the invention a target is fixed to each of the wheels.

The position of the target with respect to the wheel can be known, if possible, or else can be determined through rototranslation by the same apparatus in the step preceding measurement.

It is foreseen, according to the invention, to use at least one pair of television cameras in stereo for all of the wheels of the vehicle under consideration.

The specific example described hereafter foresees the use of as many pairs of stereo television cameras as there are wheels for which one wishes to determine the position relative to the vehicle.

For a normal automobile having two axles and four wheels, the example foresees the use of four pairs of television cameras, both of the television cameras of each pair being suitable for framing one of the wheels.

The invention then foresees that the spatial position of each target, and therefore of the wheel associated with it, determined by the respective pair of television cameras in its reference system, which we shall call $S_i$ with i=1, 2, 3, 4, be defined in a single reference system common to the four pairs of television cameras, a system we shall call W.

This result is achieved, according to the invention, in two distinct steps.

The first step consists of identifying a reference system $S_i$, external to the television cameras, for each pair of television cameras.

Preferably, the reference system $S_i$ external to the television cameras of each pair comprises the plane that interpolates the points of the image carried by the target, when the target is in a position that we shall define "zero", with respect to which all of the subsequent positions taken up by the same target shall be defined.

Position "zero" is, according to the finding, the position of the target at the start of the measurement operations, i.e. at time "$t_0$".

This step is called the zero calibration step, and in this position the translations and rotations of the target are obviously zero in the respective systems Si.

The second step to define a reference system common to all of the pairs of television cameras is called the "system calibration" step.

The position of each target has up to now referred to the stereo pair that sees it, or to the reference system $S_i$ extraneous to the television cameras of the pair as defined above.

In order to be able to check the alignment of the wheels of the vehicle it is, however, necessary to define a single reference system with respect to which the four measurements referring to each pair of television cameras are transferred.

It is thus necessary to define the relationship between the pairs of television cameras or between the relative reference systems $S_i$, and then adopt the reference system of one pair as reference system W valid also for the other three pairs, and in this way the measurement of the spatial position of the four targets is carried out in just the reference system W.

To do this, according to the finding, use is made of an auxiliary target arranged in different positions in different steps and in which it is visible simultaneously by at least one of the television cameras of a first pair of television cameras, and by at least one of the television cameras of a second pair of television cameras.

It is thus possible to localise the auxiliary target, at every position, in at least two of the four reference systems $S_i$ of the pairs of television cameras, and from here obtain the position of the television cameras with respect to each other in the single reference system W common to them.

In practice, it is necessary to carry out the localisation of the auxiliary target in three steps, respectively relative to the two pairs of television cameras dedicated to the front axle, and to each of the two with at least one of the television cameras dedicated to the rear axle.

To go from the data detected in the single reference system W defined above, to the determination of the characteristic angles of the alignment, the finding foresees defining at least one of one or more further angle measurement reference systems that make the direct reading of the characteristic angles of the wheels possible.

Said further at least one angle measurement reference systems is defined in a similar way as was described in relation to the reference system W defined above.

It is a reference system that comprises the plane of the automobile, i.e. the plane obtained as interpolation of the four points that represent the four wheel centres. The characteristic angles are measured relative to this plane and to planes perpendicular to it and to their intersections with the rolling planes of the four wheels, for toes and cambers respectively.

The advantageous features and the characteristics of the invention shall become clear from reading the following detailed description, which, with the help of the attached tables of drawings, illustrates a preferred embodiment thereof, given as a non-limiting example.

Figure 5:
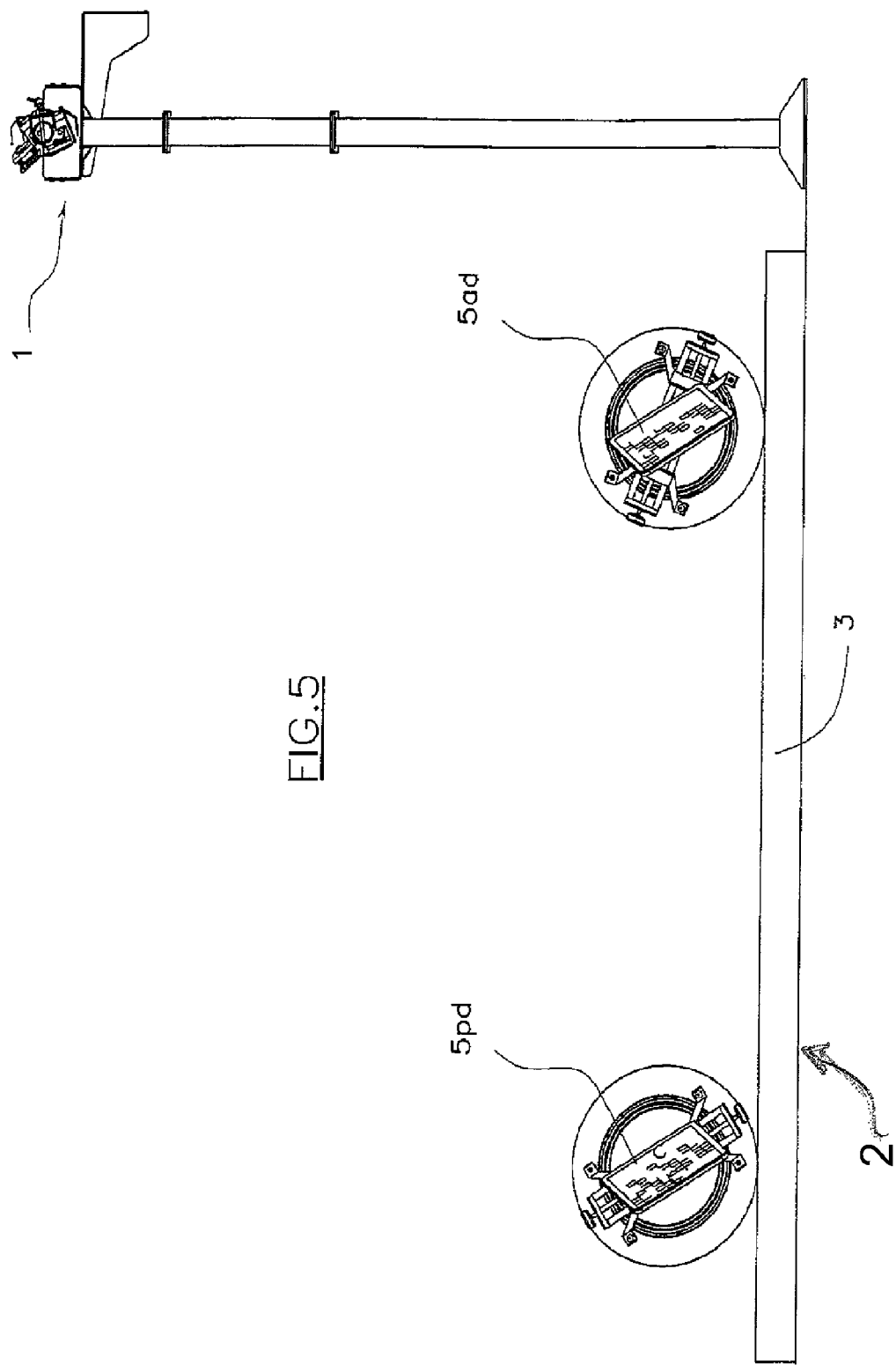

FIG. 5 schematically shows a measurement location seen from the side, in a first operative configuration.

FIG. 6 shows the measurement location of FIG. 5 in a second operative configuration.

Figure 7:
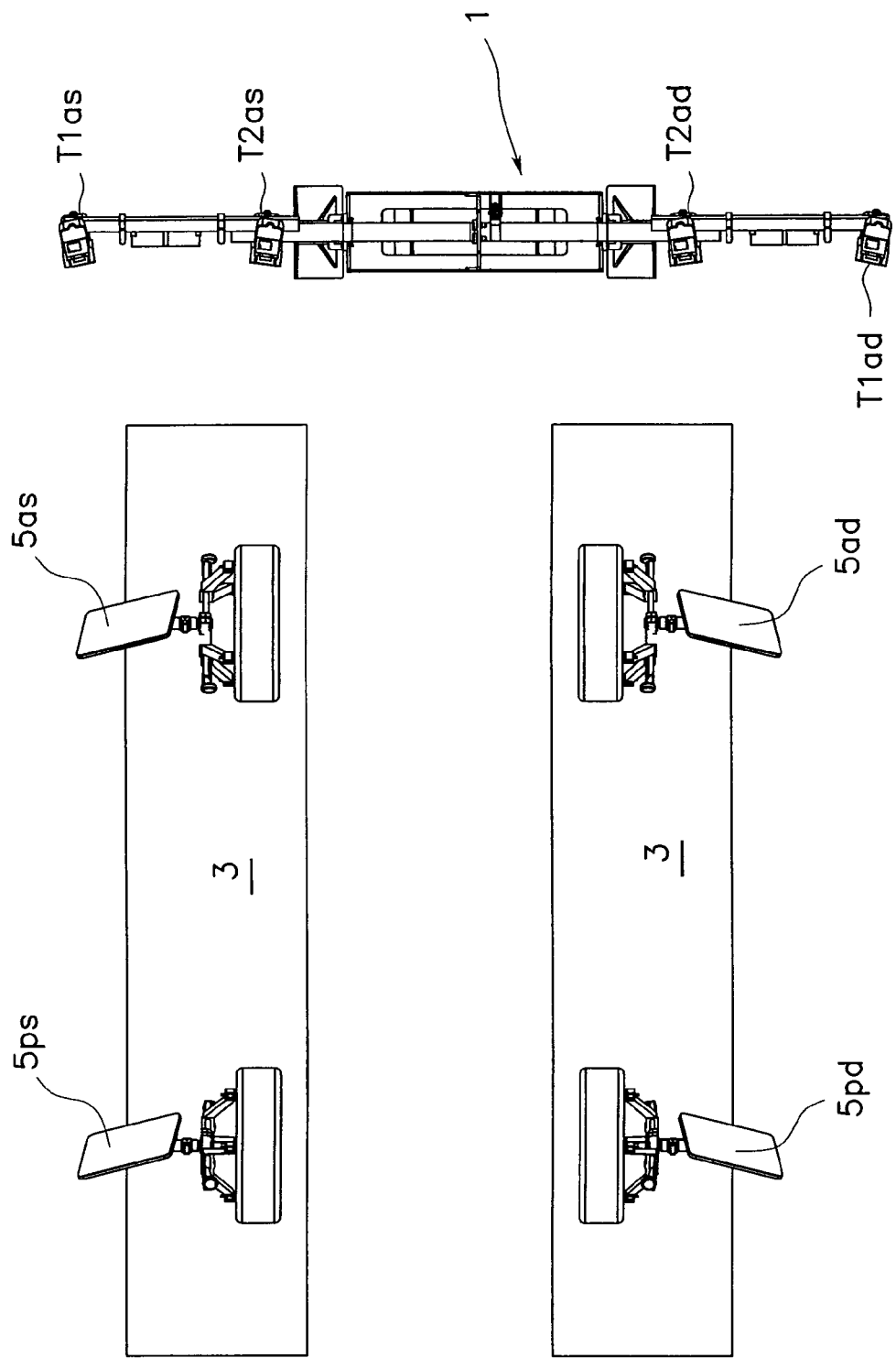

FIG. 7 shows the same location seen in plan.

Figure 8:
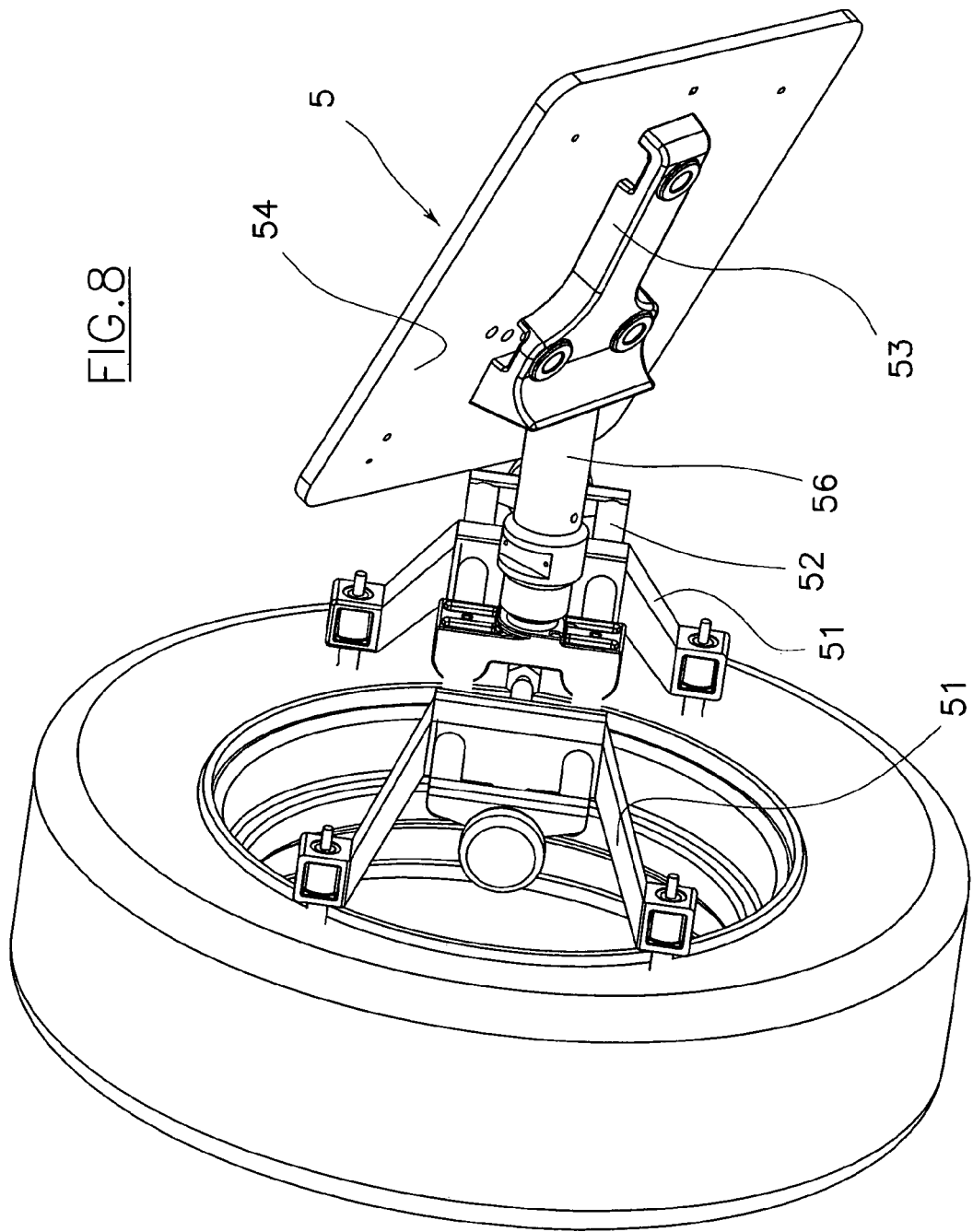

FIG. 8 schematically shows a wheel of the vehicle connected to the relative target, the same location seen in vertical section. Together with 2 generic front and rear targets connected to the sides of the wheels through suitable brackets.

Figure 9:
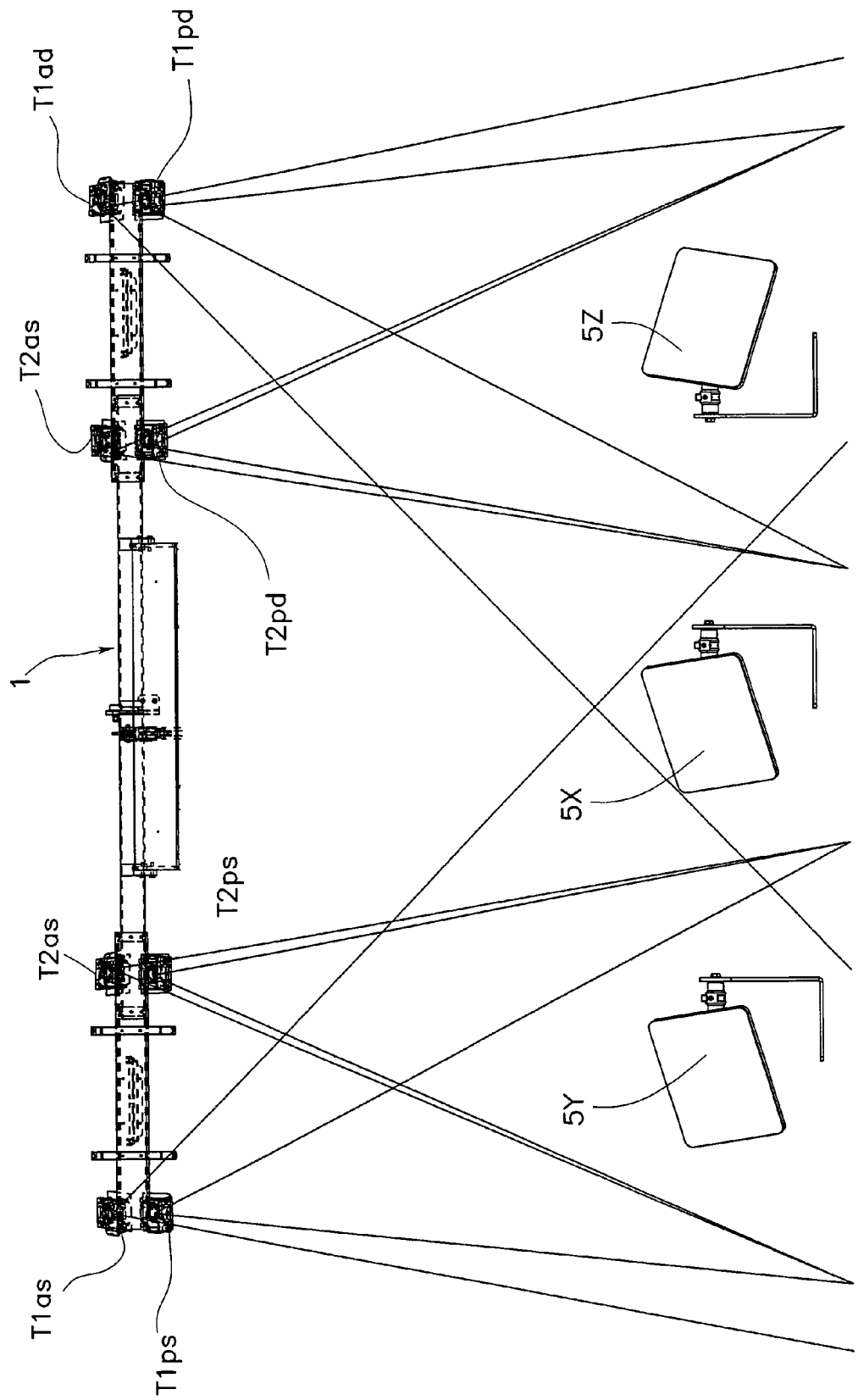

FIG. 9 shows the measurement location arranged for calibration.

Figure 10:
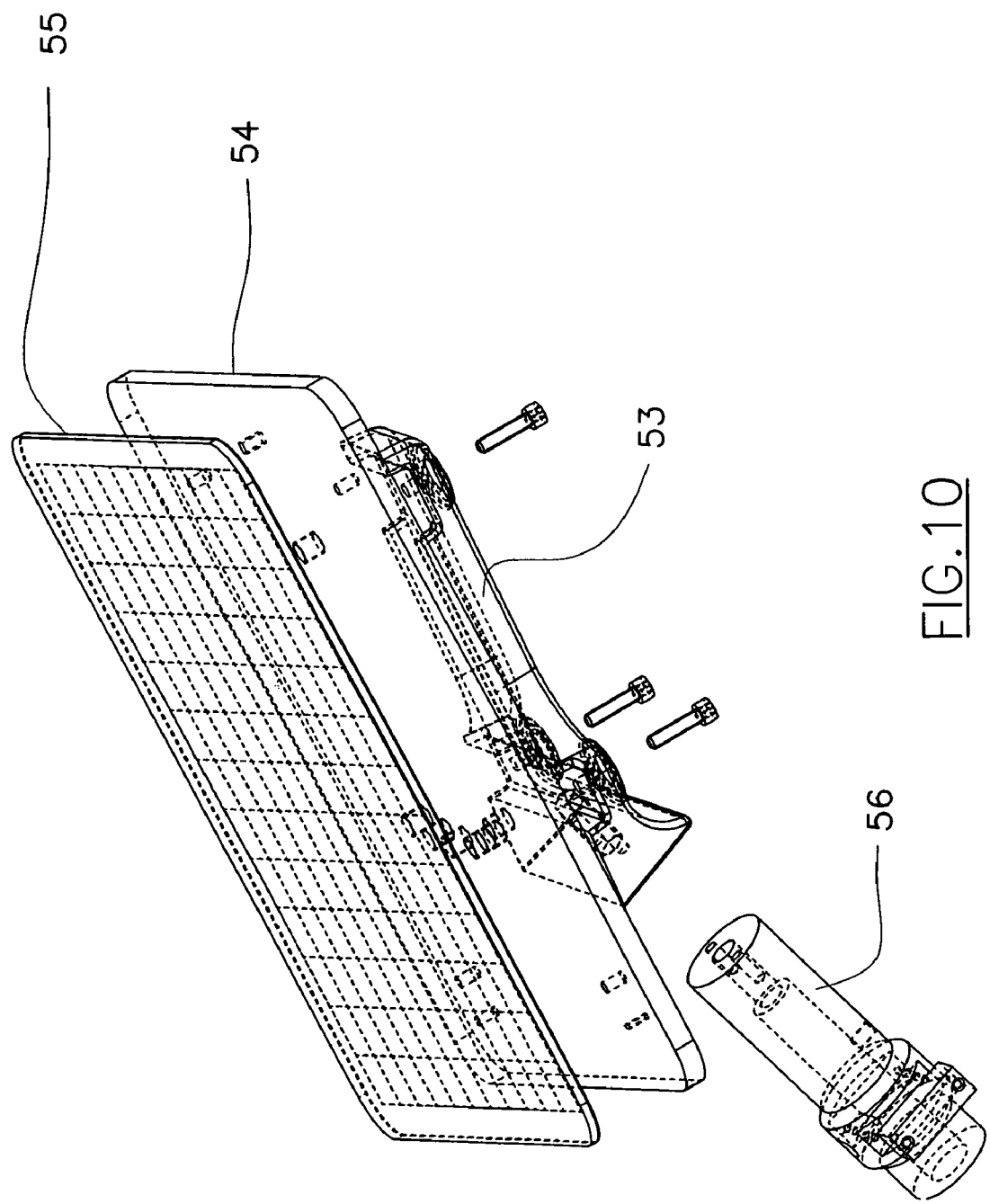

FIG. 10 shows an exploded view of a target.

Figure 11:
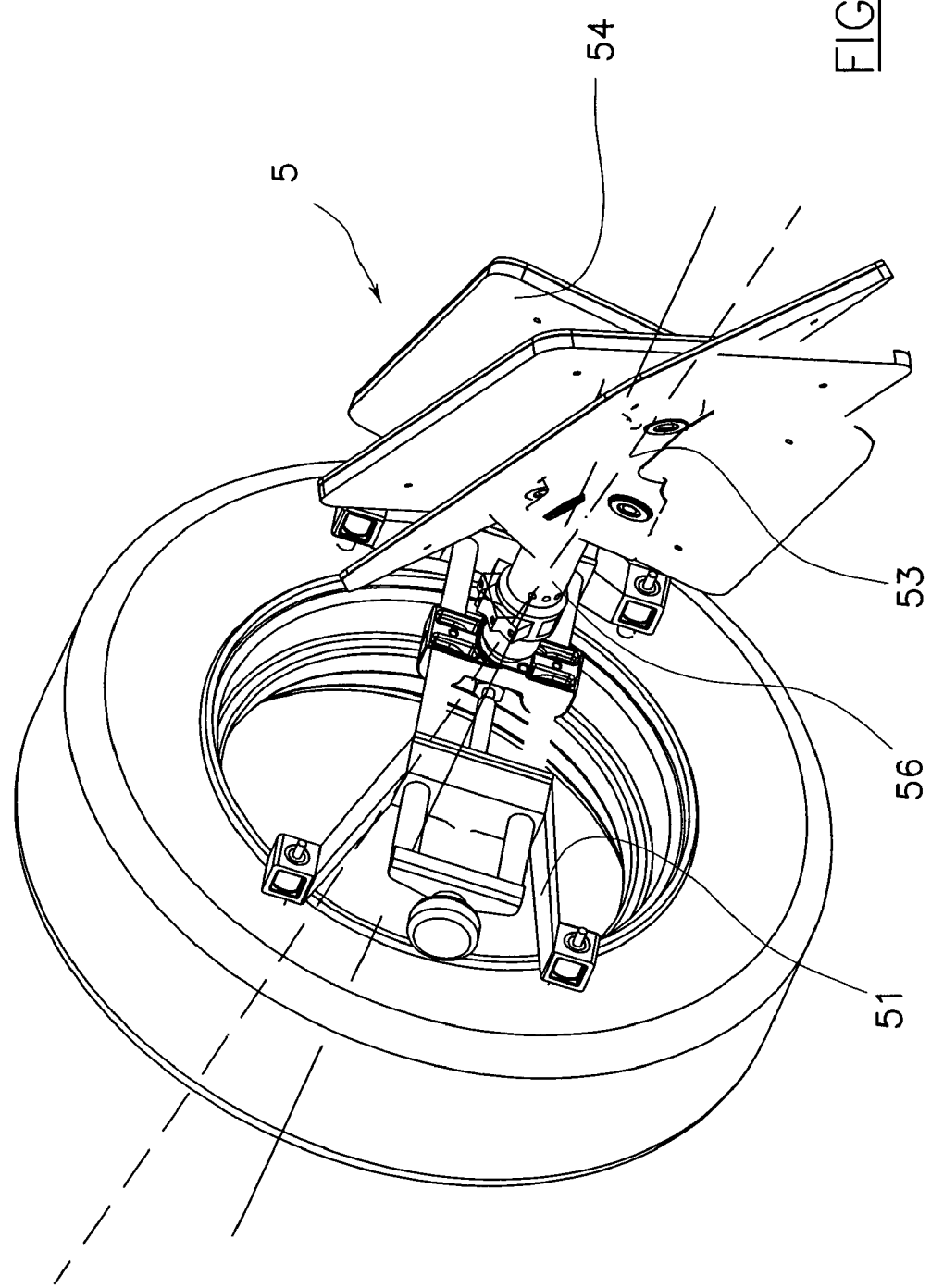

FIG. 11 shows a target in "run out" step.

Figure 12:
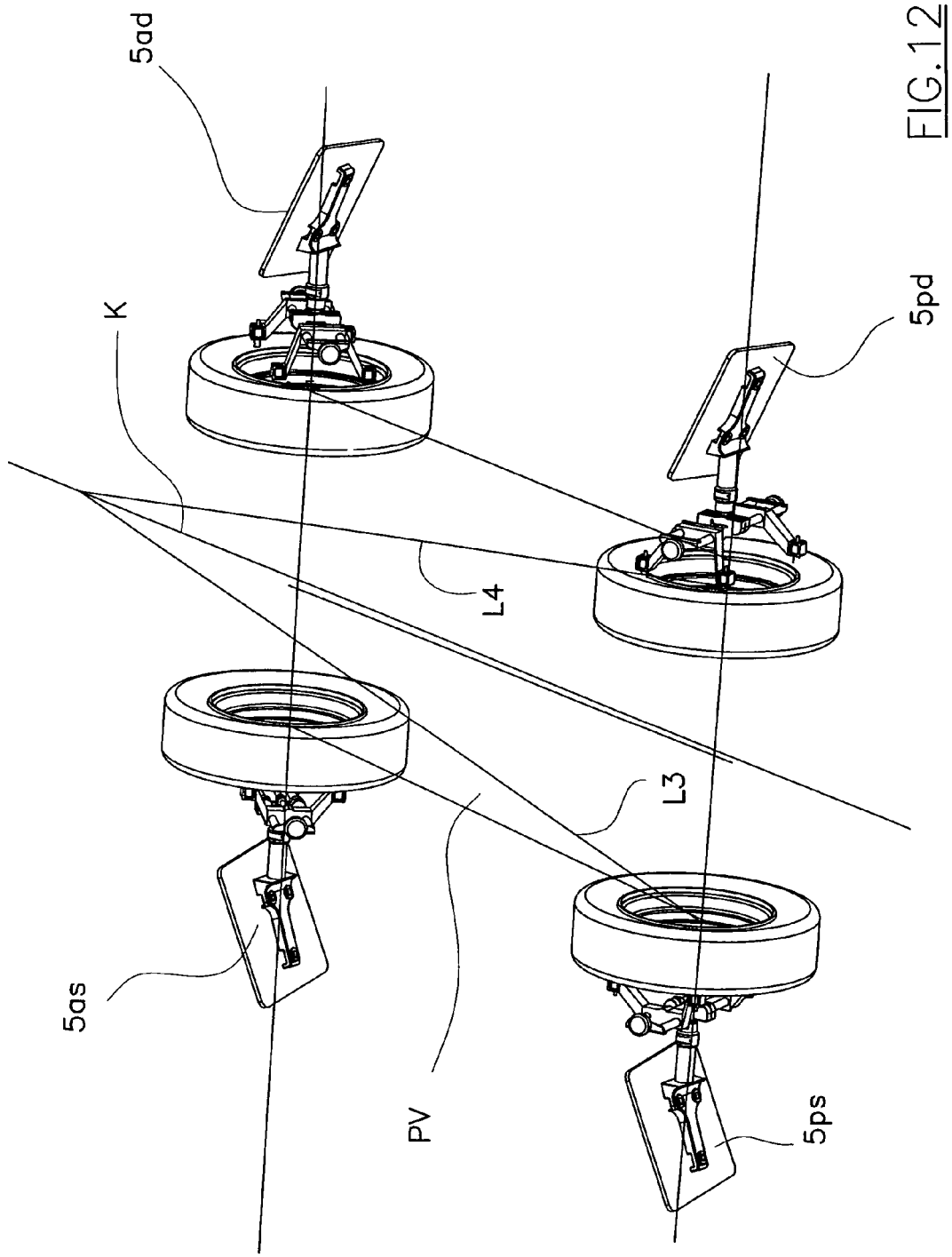

FIG. 12 shows the plane of the vehicle and the relative geometric axes.

Figure 13:
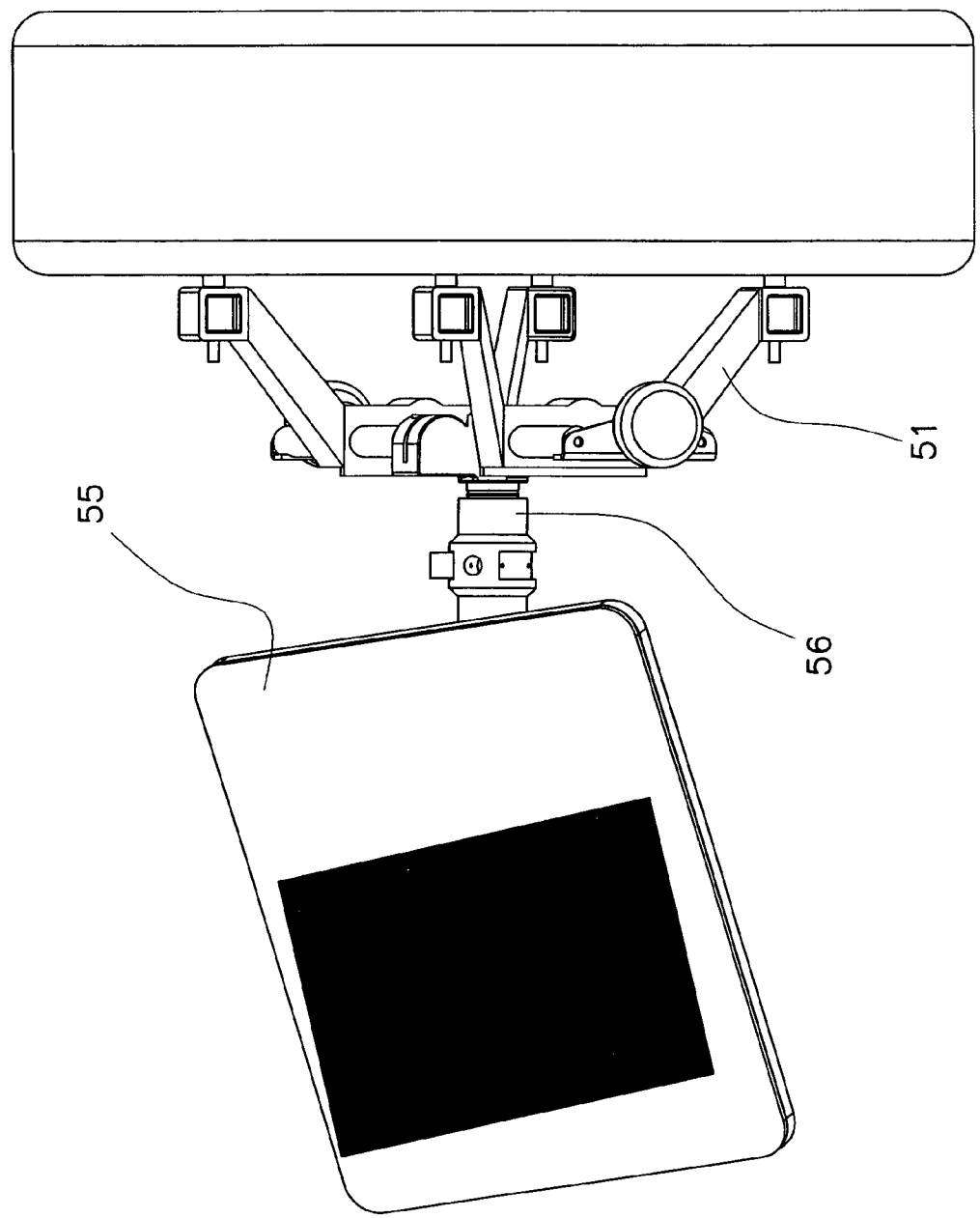

FIG. 13 shows the points of the constellation found on the image of any design through corner detection algorithms.

From the figures it is possible to see a support structure 1 of four pairs of television cameras defined as follows:
T1*ad* and T2*ad* suitable for visualising the front right wheel;
T1*as* and T2*as* suitable for visualising the front left wheel;
T1*pd* and T2*pd* suitable for visualising the rear right wheel;
T1*ps* and T2*ps* suitable for visualising the rear left wheel.

The automobile 2 is positioned opposite the structure 1 with the longitudinal axis about perpendicular to the structure 1, in other words perpendicular to the line on which the television cameras are aligned.

It goes without saying that the pairs of television cameras can also be distributed differently.

The lift 3 on which the automobile is arranged is able to lift up and lower down.

The structure 1 on which the television cameras are arranged comprises a C-shaped profile 10 arranged at a height of about 3 meters from the ground, opposite the automobile, which supports a shaft 31 capable of rotating about its own axis thanks to the actuator 32 so that the fields of vision of the pairs of television cameras cover all of the heights of the lift 3 on which the automobile rests, for all types of vehicle.

A target 5 with a pattern on surfaces permeable to infrared (of whatever geometry) is applied to each of the four wheels (FIGS. 8, 13), through the suitable brackets 51, per se known.

The target 5 comprises a shaft 56 associated with a support 52, with respect to which the shaft can rotate.

A support frame 53 is fixed to the shaft, said support frame supporting a sheet 54 of lexan, a plastic material with excellent properties of planarity and mechanical strength, having a thickness of 9 mm, coated with infrared-reflecting material, like a retroreflective adhesive film "3M Eba180" or else 3M "580-10".

The sheet 54 is covered by a sheet 55 of plastic material permeable to infrared radiation on which any design with high discontinuity gradient is reproduced, through material impermeable to infrared radiation.

Figure 1:
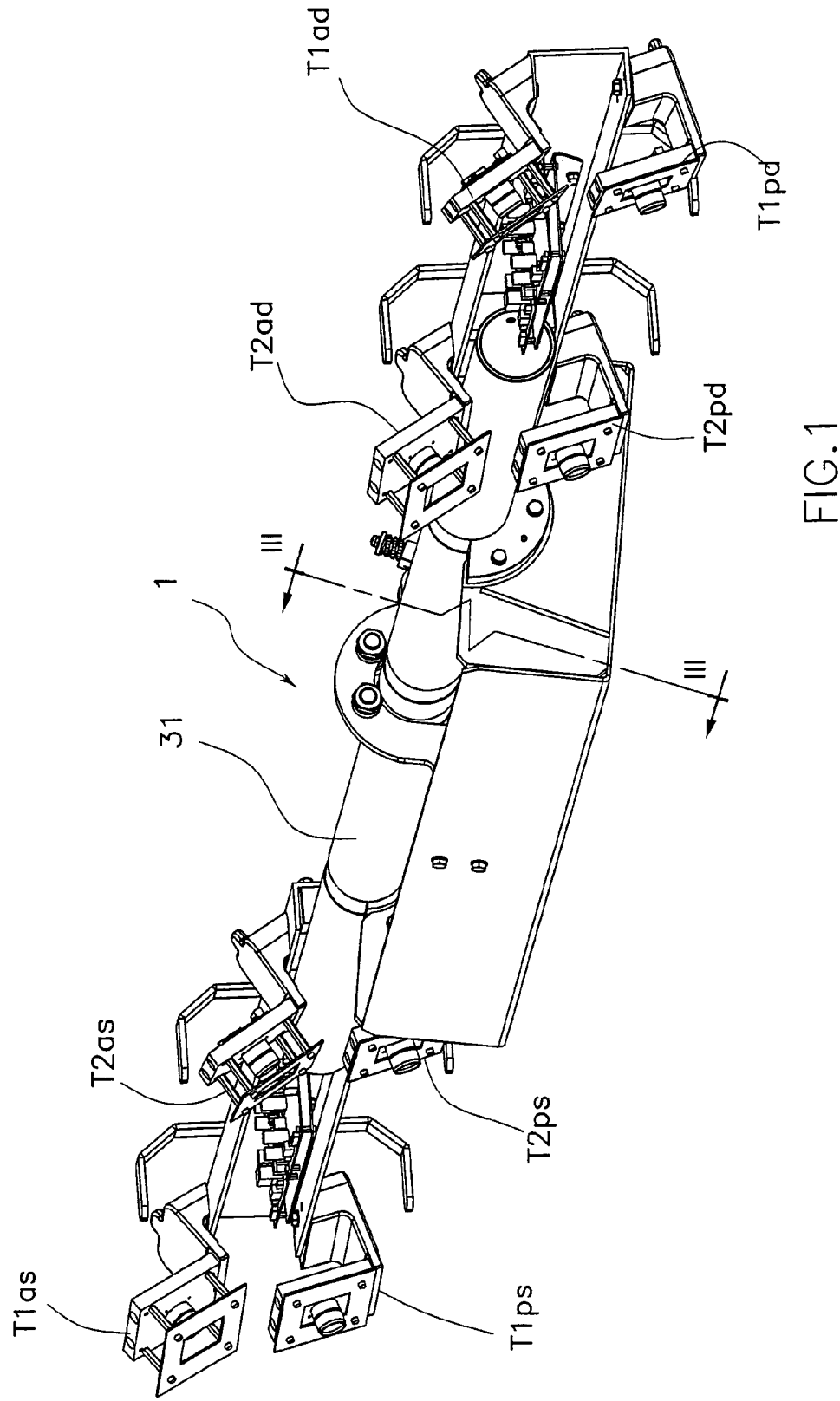
FIG. 1 shows four pairs of television cameras and relative support means.
Figure 2:
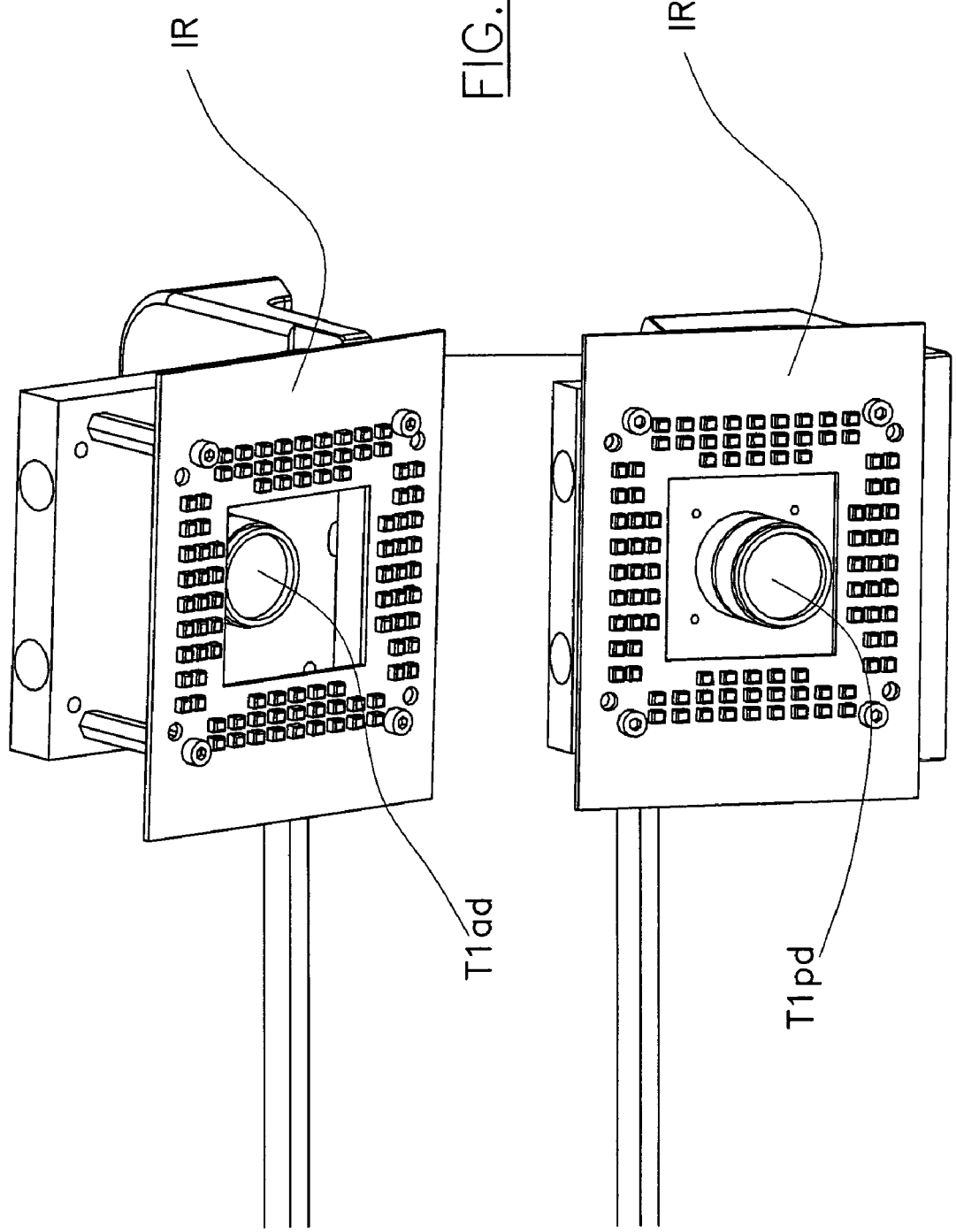
FIG. 2 shows in detail a pair of stereo television cameras with the relative infrared lighting devices.
Figure 3:
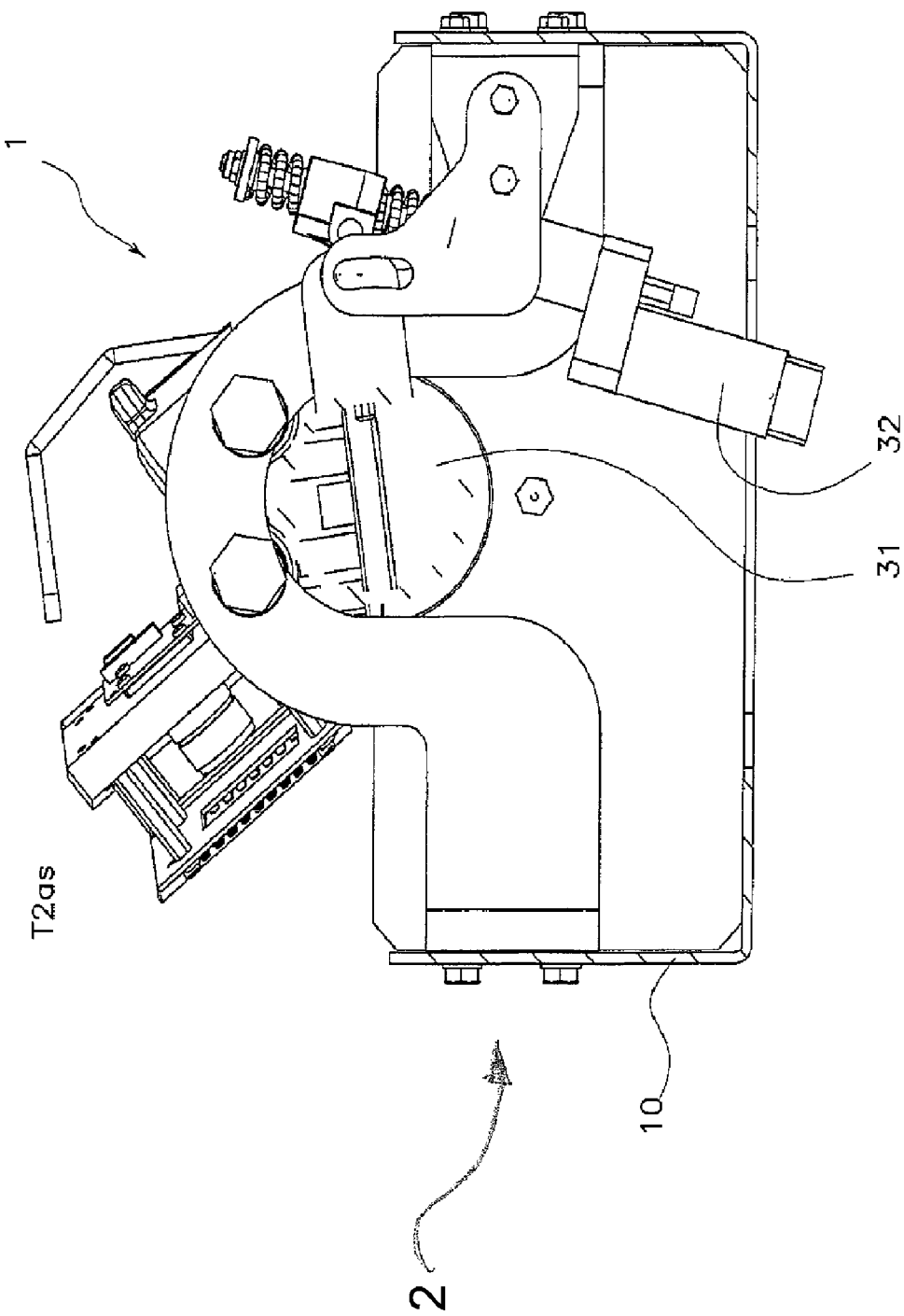
FIG. 3 shows the section III-III of FIG. 1.
Figure 4:
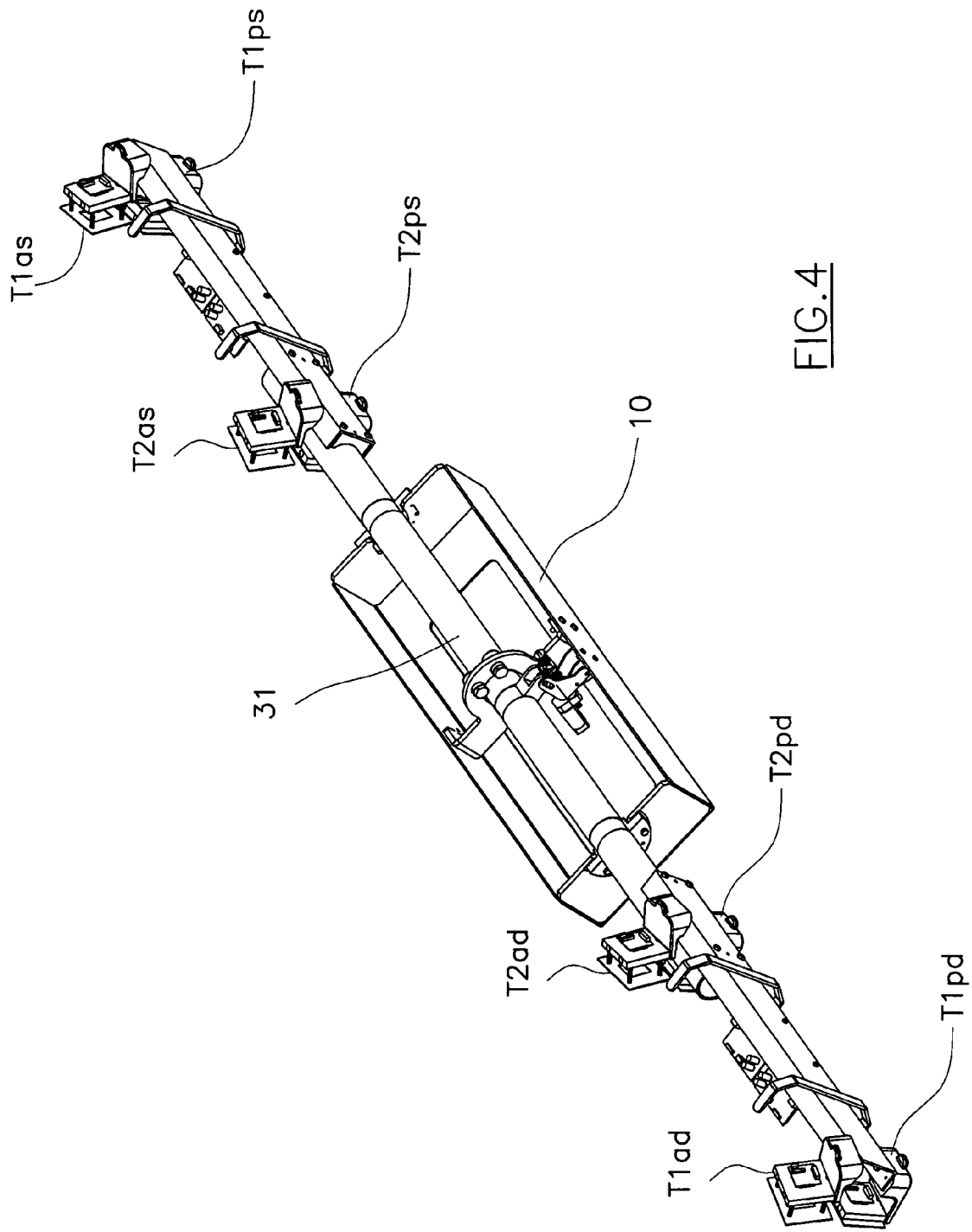
FIG. 4 is similar to FIG. 1 seen from another direction.

An IR lighting system using infrared LEDs (FIG. 2) is associated with each television camera and is able to light up said reflective surface. Each pair of television cameras is dedicated to viewing a target 5 of a wheel.

We shall have the pairs T1*as*-T2*as*, T1*ad*, T2*ad* dedicated to viewing the targets applied to the front axis of the vehicle and then the pairs T1*ps*-T2*ps*, T1*pd*-T2*pd* dedicated to viewing the targets applied to the rear axis.

The four targets are identified by numbers 5AS, 5AD, 5PS, 5PD, the suffixes of which are easy to understand.

In the illustrated example pairs of stereo television cameras are used equipped with double video sensor like Kodak KAC-9638 connected to an INTEL P4 processor through suitable interface devices and with a frame grabber like "Coreco LVDS 64". The Intel P4 PROCESSOR is able to process the images coming from the television cameras thanks to a group of known mathematical and artificial vision libraries like Intel® IPPI (Integrated Performance Primitive Image and Video Processing) and Intel® MKL (Math Kernel Library), Coreco Sapera Pro®.

Through these libraries it is possible to go from two images of reflectance of the patterns to the spatial position of each target in the system $S_i$ relative to the respective pair of stereo television cameras, and thereafter in the common system W to all the pairs of television cameras. Indeed, for each image coming from each television camera through "feature extraction" algorithms of the "corner detection" type of Kanade-Lucas-Tommasi or else Harris Operator, it is possible to identify for certain, even during the roto-translation of the targets, at least three points on the image. These points are assigned an index.

Epipolar mathematics shall then allow the "Correspondency Problem" to be solved, i.e. allow it to be determined what characteristic point of the image of a television camera of a pair of television cameras corresponds to a given characteristic point of the image of the other television camera of the same pair of television cameras.

Detail of the Algorithm for Determining the Position of the Target

Supposing that we have two calibrated television cameras, let us use as an example the pair dedicated to the front of the right hand side T1*ad* and T2*ad*, but the process should be repeated for the three remaining pairs (T1*as* and T2*as*, T1*pd* and T2*pd*, T1*ps* and T2*ps*).

The following amounts are therefore known of this pair:
$A^{(i)}$, i=1,2, matrices of the intrinsic parameters of the television camera T1*ad* and T2*ad* respectively;
$k_1^{(i)}$ and $k_2^{(i)}$, i=1,2, first and second radial distortion parameter for television camera T1*ad* and T2*ad* respectively;
the rotation matrix R and the translation vector T are also known, which allow me to pass from the reference system of television camera T1*ad* to the reference system of television camera T2*ad*, so that, if $X^{(1)}$ is a 3D point having given coordinates in the reference system of T1*ad* and $X^{(2)}$ is the same point with given coordinates in the reference system of T2*ad*, there is the relationship $$X^{(2)}=R*X^{(1)}+T$$

With a "feature extraction" algorithm (for example Corner Detection of Kanade-Lucas-Tommasi or else Harris) the following two groups of features are obtained from the images obtained by television camera 1 and 2:

$$\{m_i^{(1)}\} \text{ and } \{m_j^{(2)}\} \text{ with } i=(1,\ldots,nf_1) \text{ and } j=(1,\ldots,nf_2)$$

Every point of the first group must be associated with its corresponding one in the second group.

In order to make this association of features more certain, so as not to have ambiguity, an "ordered" neighbourhood structure is constructed for every feature of the two groups $\{m_i^{(1)}\}$ and $\{m_j^{(2)}\}$, i.e. the nearby features are identified and are put into order.

The association of the groups of features of the two images is carried out recursively starting from the best association of neighbourhoods, which is obtained by searching for the pair $$(nb_{i^*}^{(1)}, nb_{j^*}^{(2)}) \in nb^{(1)} \times nb^{(2)}$$

which obtains the maximum score with the evaluation procedure displayed below:

1. For every pair of indices (i, j) consider the pair of neighbourhoods $(nb_i^{(1)}, nb_j^{(2)})$. If the cardinality of the two neighbourhoods is different then immediately discard the association, otherwise c is their cardinality.
2. The evaluation of the association between the two neighbourhoods is carried out "without rotations", i.e. it represents the maximum score that is obtained trying all of the associations that are obtained rotating the features of $nb_j^{(2)}$ with respect to those of $nb_i^{(1)}$ by p steps with $p=0,\ldots,c-1$. The rotation is equivalent to a modulus c shift of the features, since they are already ordered in the clockwise direction.
3. The score at the association is given by exploiting the epipolar constraint as explained hereafter.

For every feature $m_1 = m_k^{(1)}$ in $nb_i^{(1)}$ consider the corresponding feature $m_2 = m_{k+p \bmod c}^{(2)}$. The metric coordinates $x_1 = (A^{(1)})^{-1} * m_1$ and $x_2 = (A^{(2)})^{-1} * m_2$ of the two features are calculated, they are normalised with respect to the coordinate z and the distortion is eliminated from them. The distance $d_{x1}$ of $x_1$ from the epipolar line $l_1$ on the image plane 1 relative to the feature $m_2$ and in the same way the distance $d_{x2}$ of $x_2$ from the epipolar line $l_2$ on the image plane 2 relative to the feature $m_1$ are calculated. The score of the association of $m_1$ with $m_2$ is given by the formula:

$$v = \log\left(\frac{1}{\varepsilon + d_{x1}/\|x_1 - e_1\| + d_{x2}/\|x_2 - e_2\|}\right)$$

where $e_1$ is the epipole on the image 1, whereas $e_2$ is the epipole on image 2. The constant $\varepsilon$ is included to prevent the denominator from becoming zero. The logarithm is used to compress the scale of scores.

The overall score of the association of $nb_i^{(1)}$ with $nb_j^{(2)}$ is obtained as the sum of the scores of the individual associations between features. In this way, as well as revealing ambiguous associations between features, higher scores shall be given to associations between neighbourhoods with higher cardinality.

3D Reconstruction

Once the best association between the neighbourhoods has been found the c features of the neighbourhoods can be associated. Prior to the association of the remaining features the 3D points relative to the current associations are reconstructed and the plane that interpolates them is calculated in the following way. If $(x_1, x_2)$ are the normalised metric coordinates from which the distortion relative to the association $(m_1, m_2)$ has been eliminated, the coordinates of the 3D point X are calculated in the following way:

$X_1 = \lambda_1 * x_1$ (coordinates of X given in reference system T1ad)
$X_2 = \lambda_2 * x_2$ (coordinates of X given in reference system T2ad)

with $\lambda_1$ and $\lambda_2$ scale factors that are obtained by solving the matrix equation $$D * \begin{bmatrix} \lambda_1 \\ \lambda_2 \end{bmatrix} = d$$

where, if $r_{1,2,3}$ are the three lines of the rotation matrix R, then $$D = \begin{bmatrix} r_1 * x_1 & -x_2(1) \\ r_2 * x_1 & -x_2(2) \\ r_3 * x_1 & -x_2(3) \end{bmatrix}$$

and $$d = -T$$

The two scale factors are thus obtained as $$\begin{bmatrix} \lambda_1 \\ \lambda_2 \end{bmatrix} = (D^T * D)^{-1} * D^T * d$$

Estimation of the Interpolating Plane

Once all of the c 3D points have been reconstructed, the plane is estimated as pair (O,n) where O is the barycentre of the c 3D points, whereas n is the unit vector normal to the plane calculated as vector relative to the smallest singular value of the covariance matrix of the points.

Association of the Remaining Features

For every pair of associated features $(m_1, m_1)$ consider the relative neighbourhoods $nb(m_1)$ and $nb(m_2)$ and associate the features of such neighbourhoods that have not yet been associated taking care to see if the following conditions have occurred:

cardinality of $nb(m_1)$ and of $nb(m_2)$ are equal
already associated features of $nb(m_1)$ and $nb(m_2)$ are equal in number
the features that are associated do not lead to 3D points the distance from the plane of which is greater than a certain predetermined threshold.

At each new association the interpolating plane is updated.

At the end of this step all of the 3D points relative to all of the associations that it has been possible to carry out have been obtained.

It is easy to use the technique outlined above to calculate the plane that interpolates the 3D points obtained.

It should be observed that, due to how the algorithm has been conceived, it carries out the correct association of all and only the features that can actually be associated, ensuring correct operation even in the case of partial blocking of the target in one or in both of the images.

Estimation of the Position of the Target in 3D Space

Given the interpolating plane, the 3D points and the normal to it n, we must determine the tern of Cartesian axes associated with the cloud of 3D points. A possible way to do so is to select a pair of 3D points, P1 and P2, which are always visible, calculate the vector joining the points (c=P2−P1), project it on the plane perpendicular to n and normalise it to obtain the unit vector v1. To obtain the third unit vector v2 of the reference system one only has to carry out the vector product between v1 and n (v2=v1×n).

The rotation matrix between the target and one of the television cameras is thus given by Rc=[v1 v2 n].

We shall thus have one Rc1, with respect to the television camera T1*ad* and one Rc2 for the television camera T2*ad*.

As far as the translation is concerned one only has to select one of the two points as origin of the reference system associated with the cloud of 3D points for which for example T=P1 again with respect to one of the 2 television cameras, for which we shall have one Tc1 for the television camera T1*ad* and Tc2 for the television camera T2*ad*. At this point the position in space of the indexed points is determined.

Then knowing three points in space relative to a reference system it is possible to define the equation of the plane passing through these points, therefore the equation of the plane of the target in the canonical form aX+bY+cZ+d=0. (B. K. P. Horn "Closed form solution of absolute orientation using quaternions").

For the sake of simplicity a Cartesian reference system $S_i$ common to each pair of television cameras with coordinated axes (Xs, Ys, Zs) has been selected.

Having defined a reference system W common to all of the pairs of television cameras, with coordinated axes (Xw, Yw, Zw), the stereoscopic system is able to determine the angles of rotation (R_Xs, R_Ys, R_Zs) of the axes of the reference systems $S_i$ with respect to the reference system W and the translation (T_Xs, T_Ys, T_Zs) of the origin of the systems $S_i$ with respect to the system W.

The rotations of the axes and the translation are usually respectively used in the form of a 3×3 rotation matrix and translation vector.

The procedure actuated by the invention is the following.

A preliminary "system calibration" step is foreseen that allows us to define a single reference system W for all of the pairs of television cameras in stereo.

Calling the four reference systems $S_i$ of the four stereo pairs S1, S2, S3, S4, the system calibration is able to define the link between these four systems.

This means that having selected one of the four systems (for example S1) the calibration establishes the rotation and the translations of the other 3 reference systems (for example S2, S3, S4) with respect to the one selected, which becomes the reference system W common to the stereo pairs and with respect to which the calculation of the characteristic angles shall be carried out.

In this step it is necessary to have at least three targets with whatever pattern, which we shall call 5X, 5Y and 5Z (FIG. 9). The first target (5X) is arranged in the area of overlapping of the fields of view of at least one television camera of the pair T1*ad*, T2*ad* dedicated to the front right axis and at least one television camera of the pair T1*as*, T2*as* dedicated to the left one. Such a position is normally located at the centre of the lift.

At this point the acquisition and processing of the images coming from television cameras of stereo pairs dedicated to opposite sides but at to the same axle allows the link between these two pairs to be created.

The link between pair T1*as*, T2*as* and the pair T1*ad*, T2*ad* is therefore created.

The system S1 measures a certain rotation and translation R1_5x, T1_5x of the target 5x and similarly S2 measures R2_5x and T2_5x of the target 5x. By composing these roto-translations through simple mathematical calculations the rotation and translation between S1 and S2 are obtained.

In formulae, saying that the transformation from one reference system to the other is g(R,T), the transformation from S2 to S1 is given:

$$g(R\_1\_2, T\_1\_2) = g(R1\_5x, T1\_5x) * g'(R2\_5x, T2\_5x)$$

where g(R1_5x, T1_5x) is the transformation between S1 and the reference system of the target 5x, similarly for g(R2_5x, T2_5x), the operation '*' is the operation of composition of transformations between reference systems and g' is the inverse transformation.

The second target 5y is positioned in the area of overlapping of the fields of view of the stereo pairs dedicated one to the front and one to the rear but on the same side. This allows the link between the stereo pairs dedicated to the same side but to opposite axles to be created, for example let us create the link between pair T1*as*, T2*as* and pair T1*ps*, T2*ps*.

The system S1 measures a certain rotation and translation R1_5y, T1_5Y of the target 5Y and similarly S4 measures a certain rotation and translation R4_5y, T4_5Y of the target 5Y. By composing these roto-translations through simple mathematical calculations the rotation and translation between S1 and S4 are obtained. In formula:

$$g(R\_1\_4, T\_1\_4) = g(R1\_5y, T1\_5y) * g'(R4\_5y, T4\_5y)$$

This operation must also be repeated for the other side (therefore if first we have created the link between systems S1 and S4, we shall now create the link between systems S2 and S3). It is possible to do so by having a third target 5Z positioned in the area of overlapping of the fields of view of the stereo pairs dedicated one to the front and one to the rear of the same side but opposite to that selected for the target 5Y.

The system S2 measures a certain rotation and translation R2_5z, T2_5z of the target and similarly S3 measures a certain rotation and translation R3_5z and T3_5z. By composing these roto-translations through simple mathematical calculations the rotation and translation between S3 and S2 are obtained. In formula:

$$g(R\_2\_3, T\_2\_3) = g(R2\_5z, T2\_5z) * g'(R3\_5z, T3\_5z)$$

Having obtained these three links, we are able to also work out the fourth relationship, i.e. between S1 and S3 through a simple mathematical operation of composition of the roto-translations. In formulae:

$$g(R\_1\_3, T\_1\_3) = g(R\_1\_2, T\_1\_2) * g(R\_2\_3, T\_2\_3)$$

Having carried out the calibration of the system, the automobile is placed on the lift and the targets are mounted on the individual wheels.

The targets that are mounted on the individual wheels are identified, as stated, by the symbols 5AS, 5AD, 5PS and 5PD.

In the example the relationship between each target and the respective wheel is presumed to be known.

Moreover, it is possible to compensate for possible errors in mechanical coupling between resting plane of the bracket to which the target is attached and the real plane of the wheel, obtaining and measuring each target in many position with the wheels in motion, thus obtaining the correct relationship between target and wheel, as well as the oscillation of the wheel plane during rolling.

To continue the detection of the characteristic angles it is necessary to define the plane of the automobile in reference system W.

Knowing the relationship between each target and the respective wheel, we are able to establish the coordinates of the four wheel centres referring to the reference system W common to the four stereo pairs.

The four wheel planes are defined starting from the rotation axes of the wheel, the wheel plane being perpendicular to the axis.

The plane interpolating the four wheel centres is defined the "automobile plane" PV.

By interpolating plane we mean the average plane of the four planes defined by the four terns of points corresponding to the four wheel centres.

The intersection between automobile plane and wheel plane defines 4 lines of intersection L1, L2, L3, L4.

The front toe is the angle formed by L1 and L2 with the thrust axis, whereas the toe at the rear is the angle formed by L3 and L4 with the axis K of symmetry.

The angles formed between the vertical to the automobile plane and the wheel planes provide the camber angles.

The subsequent step consists of obtaining and processing different positions of the targets applied to the front axle by rotating the steering of the automobile in symmetrical positions with respect to the position with the steering wheel straight. The composition of the special positions of each target allows the steering axis of the vehicle and from this all of the characteristic angles of the automobile to be defined.

The invention claimed is:

1. Method for determining characteristic angles and characteristic parameters of alignment of a vehicle situated at a measurement location comprising the following steps:
   equipping each of the wheels of the vehicle with a flat target carrying any design;
   determining relationship between the position of the target and each of the wheels;
   arranging at least one pair of television cameras such that said at least one pair of television cameras have a known relative position and together form a stereo system, said at least one pair of television cameras being arranged in a position such that said at least one pair of television cameras view at least the target associated with each wheel along two different viewing paths;
   taking two 2 dimensional images of the target associated with the wheel, by respective television cameras of said at least one pair of television cameras;
   comparing the two 2 dimensional images, to put points of the image taken by a television camera in relation to corresponding points of the image taken by the other television camera, resorting to epipolar mathematics;
   creating a three-dimensional image of the target by means of the comparison of the images taken by said at least one pair of television cameras;
   creating a spatial reference system W to which said three-dimensional image of the target refers;
   processing the three-dimensional image of the target collected by the at least two television cameras and determining the angular orientation and the position of the target in a spatial reference system W; and
   using said position and angular orientation to determine the alignment of the wheel relative to the spatial reference system.

2. Method according to claim 1, wherein said at least one pair of television cameras comprises a pair of television cameras for each wheel of the vehicle.

3. Method according to claim 2, wherein the spatial reference system W is defined by
   i) placing an auxiliary target having the design in a succession of positions, at successive times, in each of which the auxiliary target is visible simultaneously from at least one of the television cameras of a first pair of television cameras, and from at least one of the television cameras of a second pair of television cameras, and
   ii) repeating the step of placing the auxiliary target in different positions of the target so that the auxiliary target is visible from one of the television cameras used previously and from a television camera of a further pair of television cameras until at least one television camera of each pair of television cameras has been used;
   iii) processing stereo images obtained from the pairs of television cameras so as to define the spatial reference system W common to all of the television cameras.

4. Method according to claim 3, wherein, for an automobile with two axles and four wheels, the spatial reference system W is defined in three steps, respectively relative to the two pairs of television cameras dedicated to the front axle, and to each of said two pairs of television cameras with at least one of the television cameras dedicated to the rear first on one side of the vehicle and then on the opposite side.

5. Device for determining angles and characteristic parameters of the alignment of a vehicle situated at a measurement location, comprising:
   at least one target of a particular shape and carrying a design applied to at least one wheel of the vehicle;
   at least one pair of television cameras constituting a stereo system to generate a three-dimensional image of said target, arranged in a position such that said at least one pair of television cameras views at least the one target along two different viewing paths,
   a processor to:
      compare the two 2 dimensional images, to put points of the image taken by a television camera in relation to corresponding points of the image taken by the other television camera, resorting to epipolar mathematics, for generating the three-dimensional image of said target;
      process the three-dimensional image of the target collected by the pair of television cameras and determining the angular orientation and the position of the target in a spatial reference system W, and
      determine alignment of the wheel relative to the spatial reference system using an angular orientation and position of the target in the spatial reference W.

6. Device according to claim 5, further comprising an infra-red lighting device associated with each pair of television cameras.

7. Device according to claim 5, wherein each target comprises a flat sheet applied to the wheel of the vehicle on which a design having a high discontinuity gradient, and which is coated by a layer of infrared-permeable material, is reproduced, through material impermeable to infrared radiation.

8. Device according to claim 7, wherein the flat sheet is coated with infrared-reflecting material.

9. Device according to claim 5, wherein a flat sheet is associated with the respective wheel in known position, through a bracket that allows rotations about the axis of the wheel.

10. Device according to claim 5, further comprising as many pairs of television cameras making as many stereo systems as there are wheels of the vehicle.

11. Device according to claim 10, wherein the pairs of television cameras are supported by a common support arranged at a distance from the support plane of the vehicle so that every pair collects the stereo image of a target associated with a wheel of the vehicle.

12. Device according to claim 5, further comprising a lift on which the vehicle is arranged.

13. Device according to claim 11, wherein said common support is arranged at a fixed height from the ground and can be orientated according to its distance from the support plane of the vehicle.

14. Method for determining characteristic angles and characteristic parameters of alignment of a vehicle situated at a measurement location comprising the following steps:
- equipping each of the wheels of the vehicle with a flat target carrying any design;
- determining relationship between the position of the target and each of the wheels;
- arranging four pair of television cameras, one pair of television cameras for each of the wheels, each pair of television cameras being arranged in a position to view the target associated with the wheel along two different viewing paths and having a known relative position and together forming a stereo system;
- taking two 2 dimensional images of the target associated with the wheel, by respective television cameras of said at least one pair of television cameras;
- creating a three-dimensional image of the target by means of a comparison of the images taken by said at least one pair of television cameras;
- processing the three-dimensional image of the target collected by the at least two television cameras and determining the angular orientation and the position of the target in a spatial reference system W common to all said four pairs of television cameras, previously generated, to which said three-dimensional image of the target refers; and
- using said position and angular orientation to determine the alignment of the wheel relative to the spatial reference system, wherein the spatial reference system W is generated through the following steps:
  i) placing an auxiliary target, carrying any design, in a succession of positions, at successive times, in each of which position the auxiliary target is visible simultaneously from at least one of the television cameras of a first pair of television cameras, and from at least one of the television cameras of a second pair of television cameras, for creating a stereo image of the auxiliary target by means of a comparison of said images, and
  ii) repeating the step of placing the auxiliary target in different positions of the target so that the auxiliary target is visible from one of the television cameras used previously and from a television camera of a further pair of television cameras, until at least one of the television cameras of all pairs of television cameras has been used;
  iii) processing the stereo images obtained from said pairs of television cameras so as to define the spatial reference system W common to the television cameras of all pairs of television cameras.

15. Method for determining characteristic angles and characteristic parameters of alignment of a vehicle situated at a measurement location comprising the following steps:
- equipping each of the wheels of the vehicle with a flat target carrying any design;
- determining relationship between the position of the target and each of the wheels;
- arranging four pair of television cameras, one pair of television cameras for each of the wheels, each pair of television cameras being arranged in a position to view the target associated with the wheel along two different viewing paths and having a known relative position and together forming a stereo system;
- taking two 2 dimensional images of the target associated with the wheel, by respective television cameras of said at least one pair of television cameras;
- comparing the two 2 dimensional images, to put points of the image taken by a television camera in relation to corresponding points of the image taken by the other television camera, resorting to epipolar mathematics;
- creating a three-dimensional image of the target by means of a comparison of the images taken by said at least one pair of television cameras;
- processing the three-dimensional image of the target collected by the at least two television cameras and determining the angular orientation and the position of the target in a spatial reference system W common to all said four pairs of television cameras, previously generated, to which said three-dimensional image of the target refers; and
- using said position and angular orientation to determine the alignment of the wheel relative to the spatial reference system, wherein the spatial reference system W is generated through the following steps:
  i) placing an auxiliary target, carrying any design, in a succession of positions, at successive times, in each of which position the auxiliary target is visible simultaneously from at least one of the television cameras of a first pair of television cameras, and from at least one of the television cameras of a second pair of television cameras, for creating a stereo image of the auxiliary target by means of a comparison of said images, and
  ii) repeating the step of placing the auxiliary target in different positions of the target so that the auxiliary target is visible from one of the television cameras used previously and from a television camera of a further pair of television cameras, until at least one of the television cameras of all pairs of television cameras has been used;
  iii) processing the stereo images obtained from said pairs of television cameras so as to define the spatial reference system W common to the television cameras of all pairs of television cameras.

* * * * *